(12) United States Patent
Shirakura et al.

(10) Patent No.: US 6,491,395 B2
(45) Date of Patent: Dec. 10, 2002

(54) IMAGE REPRODUCING APPARATUS FOR HOLOGRAM OR HOLOGRAPHIC STEREOGRAM

(75) Inventors: Akira Shirakura, Tokyo (JP); Seijiro Tomita, Tokyo (JP); Toshio Kikuchi, Tokyo (JP); Toshio Iribe, Kanagawa (JP); Nobuhiro Kihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/158,533

(22) Filed: May 30, 2002

(65) Prior Publication Data

US 2002/0145704 A1 Oct. 10, 2002

Related U.S. Application Data

(63) Continuation of application No. 09/429,573, filed on Oct. 28, 1999.

(30) Foreign Application Priority Data

Oct. 30, 1998 (JP) .......................... 10-331475

(51) Int. Cl.⁷ ...................... G03B 21/00; G03B 21/22; G03H 1/00; G03H 1/26; A47G 1/06
(52) U.S. Cl. ............................ 353/7; 353/119; 40/446; 40/452; 40/442; 40/714; 40/716; 40/779; 40/781; 359/1; 359/23
(58) Field of Search ............................ 353/7, 10, 119; 40/446, 451, 452, 442, 574, 714, 716, 779, 781; 359/1, 23, 466; 455/566

(56) References Cited

U.S. PATENT DOCUMENTS

| | | | |
|---|---|---|---|
| 4,807,971 A | 2/1989 | Nurano | 350/13.6 |
| 5,296,948 A | 3/1994 | Chen et al. | 359/1 |
| 5,677,701 A | 10/1997 | Okuyama et al. | 345/7 |
| 5,822,088 A | 10/1998 | Danno et al. | 359/1 |
| 6,018,403 A | 1/2000 | Shikakura et al. | 359/23 |
| 6,070,350 A * | 6/2000 | Fantone et al. | 40/454 |
| 6,145,229 A | 11/2000 | Able | 40/446 |
| 6,254,247 B1 | 7/2001 | Carson | 362/101 |
| 2001/0023194 A1 | 9/2001 | Pettersson et al. | 455/566 |

* cited by examiner

*Primary Examiner*—Russell Adams
*Assistant Examiner*—Melissa Koval
(74) *Attorney, Agent, or Firm*—Frommer Lawrence & Haug LLP; William S. Frommer; Glenn F. Savit

(57) ABSTRACT

An image reproducing apparatus having a small size and which is highly portable reproduces an image contained within a hologram or holographic stereogram. In one embodiment, when a movable section movably attached to an apparatus body is moved from a first position, in which the movable section abuts the apparatus body, to a second position in which the movable section and apparatus body are separated, illumination light from a light source is irradiated at a predetermined incidence angle onto a hologram or holographic stereogram attached to a hologram attach section. In other embodiments, light from a light source is reflected from an edge portion of a light transmitting member, or from a separately provided mirror, to be irradiated at a predetermined angle onto the hologram or holographic stereogram.

13 Claims, 9 Drawing Sheets

IMAGE REPRODUCING APPARATUS FOR HOLOGRAM OR HOLOGRAPHIC STEREOGRAM

This application is a continuation of U.S. patent application Ser. No. 09/429,573 filed Oct. 28, 1999.

BACKGROUND OF THE INVENTION

Technical Field

The present invention relates to an image reproducing apparatus for reproducing an image by irradiating illumination light to a hologram or a holographic stereogram.

A holographic stereogram is prepared as follows. An object is sequentially picked up from different observation viewpoints, to obtain a number of images. These images which are used as original images are recorded sequentially as hologram elements in form of strips or dots onto a piece of hologram recording medium, by means of an image recording apparatus.

For example, as shown in FIG. 1, a holographic stereogram having parallax Ad information in only the lateral direction is prepared in a manner in which a plurality of original images 101a to 101e obtained by sequentially picking up an object 100 from different observation points in the lateral direction are sequentially recorded as strip-like hologram elements 102 onto a hologram recording medium.

With the holographic stereogram, pieces of image information obtained by sequentially picking up an object from different observation points in the lateral direction are sequentially recorded as strip-like hologram elements in the lateral direction. Therefore, when this holographic stereogram is visually observed by an operator, two-dimensional images respectively projected on the left and right eyes are slightly different from each other. As a result, the operator feels parallax so a three-dimensional image is reproduced.

Meanwhile, in case of a normal hologram, an illumination light source for reproducing a three-dimensional image is distant from the hologram. Therefore, a normal hologram requires a large space for reproduction of an image, and the position relationship between the hologram and the illumination light source must be set in compliance with a determined condition, in order to reproduce an image under optimal condition. This also applies to a holographic stereogram consisting of a plurality of hologram elements.

In contrast, if the illumination light source and the hologram are integrated with each other, the position relationship between the hologram and the illumination light source is kept always constant, so that reproduction can always be performed under an optimal conditions.

Based on the idea described above, a hologram stand (commercial name: HOLOSPOT4511, manufactured by CHUOHSEIKI) as show in FIG. 2 has been designed and provided as a commercial product. This hologram stand 110 comprises a light source 111 and a hologram holder 112 and is arranged such that illumination light emitted from the light source 111 is irradiated constantly at an optimal incidence angle to a hologram or holographic stereogram 113 held by a hologram holder 112.

Meanwhile, it is desirable that a hologram or holographic stereogram can be freely observed at any place, which is not limited to particular places. Therefore, a reproducing apparatus for reproducing a hologram or holographic stereogram should desirably have excellent portability and can be carried with ease.

However, the hologram stand 110 has been designed as a floor type reproducing apparatus and therefore has a shape which is unsuitable for transportation, e.g., the apparatus itself is large and the light source 11 is projected from the main body part as shown in FIG. 2.

Also, in case of a floor type reproducing apparatus like the hologram stand 110, a change is caused in the relative position relationship between the light source 111 and the hologram holder 1 12 while carrying the apparatus. Hence, there may be a case that the hologram or holographic stereogram held by the hologram holder 112 cannot be reproduced under optimal conditions.

Therefore, the present invention has an object of providing an image reproducing apparatus which is small and excellent in portability and is capable of reproducing a hologram or holographic stereogram constantly under optimal conditions.

Summary of the Invention

To achieve the above object, an image reproducing apparatus according to the present invention comprises: an apparatus body; and a movable section attached to the apparatus body such that the movable section is movable between a first position where the movable section is contained in the apparatus body and a second position distant from the first position, wherein an attach section to which a hologram or holographic stereogram is attached is provided in one of the apparatus body and the movable section is provided with, and a light source for emitting illumination light to be irradiated onto the hologram or holographic stereogram attached to the attach section is provided in another one of the apparatus body and the movable section, and when the movable section is moved to the second position, the illumination light emitted from the light source is irradiated at a predetermined incidence angle onto the hologram or holographic stereogram attached to the attach section.

According to the image reproducing apparatus described above, the movable section is moved to the first position where this section is contained in the apparatus body, during a non-observation period of carrying the apparatus. During observation, the movable section is moved to the second position where illumination light from a light source provided in one of the apparatus body and the movable section is irradiated at a predetermined incidence angle onto a hologram or holographic stereogram attached to an attach section provided in the other one of the apparatus body and the movable section.

Therefore, according to the image reproducing apparatus, the entire apparatus can be put to be compact so that portability is improved during a non-observation period or the like for carrying the apparatus. During observation, illumination light emitted from the light source is irradiated at an optimal incidence angle onto a hologram or holographic stereogram attached to the attach section so that an excellent reproduced image can be reproduced.

In the image reproducing apparatus, it is preferable that electric power supply means for supplying an electric power to the light source is provided in one of the apparatus body and the movable section.

If electric power supply means is provided in one of the apparatus body or the movable section in the image reproducing apparatus, as described above, it is unnecessary to supply an electric power for driving the light source from outside of the apparatus, so that the portability can be much more improved.

It is also desirable that the image reproducing apparatus comprises a switching mechanism for rendering the electric power supply means and the light source conductive to each other when the movable section is moved to the second position, and for electrically disconnect the electric power supply means and the light source from each other, when the movable section is moved from the second position.

If the image reproducing apparatus thus comprises a switching mechanism for switching the electric power supply to the light source depending on whether or not the movable section is positioned at the second position, the electric power supplied to the light source can be shut off during a non-observation period, so that power consumption can be saved.

Also, it is desirable that this image reproducing apparatus comprises a positioning mechanism for positioning the movable section to the second position.

If the image reproducing apparatus thus comprises a positioning mechanism for positioning the movable section to the second position, the position relationship between the light source and the hologram or holographic stereogram attached to the attach section can be maintained constantly under optimal conditions.

In addition, another image reproducing apparatus according to the present invention constructed to achieve the above object comprises: an apparatus body; an attach section provided in the apparatus body, to which a hologram or holographic stereogram is attached; a light source provided in the apparatus body, for emitting illumination light to be irradiated onto the hologram or holographic stereogram attached to the attach section; and light passage bending means provided on a light passage of the illumination light emitted from the light source in the apparatus body, for reflecting the illumination light emitted from the light source, thereby to irradiate the illumination light at a predetermined angle to the hologram or holographic stereogram attached to the attach section.

According to the image reproducing apparatus, the illumination light emitted from the light source provided in the apparatus body is reflected by the light passage bending means provided on the light passage of the illumination light and is irradiated at a predetermined incidence onto the hologram or holographic stereogram attached to the attach section provided in the apparatus body.

Therefore, in the image reproducing apparatus, the entire apparatus can be arranged to be compact so that the portability is improved, while maintaining a light passage length necessary for irradiating illumination light emitted from the light source onto the hologram or holographic stereogram attached to the attach section under optimal conditions. Besides, the illumination light emitted from the light source can be irradiated at an optimal incidence angle onto the hologram or holographic stereogram attached to the attach section, so that an excellent reproduced image can be reproduced.

It is desirable that the image reproducing apparatus comprises a cover member, wherein when the cover member is moved in a direction in which the apparatus body is closed, an end portion of the hologram or holographic stereogram is clamped between the apparatus body and the cover member, thereby to attach the hologram or holographic stereogram to the attach section.

If the image reproducing apparatus is thus constructed such that an end portion of the hologram or holographic stereogram is clamped between the apparatus body and the cover member, the hologram or holographic stereogram can be securely attached to the attach section.

Also, in the image reproducing apparatus, it is desirable that the apparatus body has a substantially cylindrical shape, and a hologram or holographic stereogram having a substantially cylindrical shape is attached to the attach section, and the hologram or holographic stereogram having the substantially cylindrical shape, which is attached to the attach section, is observed from a circumferential surface of the apparatus body.

If a substantially cylindrical hologram or holographic stereogram is thus observed from the circumferential surface of the apparatus body having a substantially cylindrical shape, a reproduced image of the hologram or holographic stereogram can be observed as a more three-dimensional image.

As described above, in the image reproducing apparatus according to the present invention, the illumination light from the light source is irradiated at a predetermined incidence angle onto the hologram or holographic stereogram, when the movable section movably attached to the apparatus body is moved to the second position where the movable section is contained in the apparatus body, apart from the first position. Therefore, during a non-observation period for carrying the apparatus or so, the entire apparatus is put to be compact so that the portability is improved. During observation, a hologram or holographic stereogram can be reproduced constantly under optimal conditions.

Also, as described above, the image reproducing apparatus according to the present invention comprises a light passage bending means for reflecting illumination light in the apparatus body, and the light passage of the illumination light emitted from the light source is bent in the apparatus body thereby to irradiate the illumination light at a predetermined angle onto the holograph or holographic stereogram. Therefore, the entire apparatus can be downsized while maintaining a light passage length of illumination light which is necessary to reproduce a hologram or holographic stereogram excellently.

DETAILED DESCRIPTION OF THE INVENTION

Figure 1:
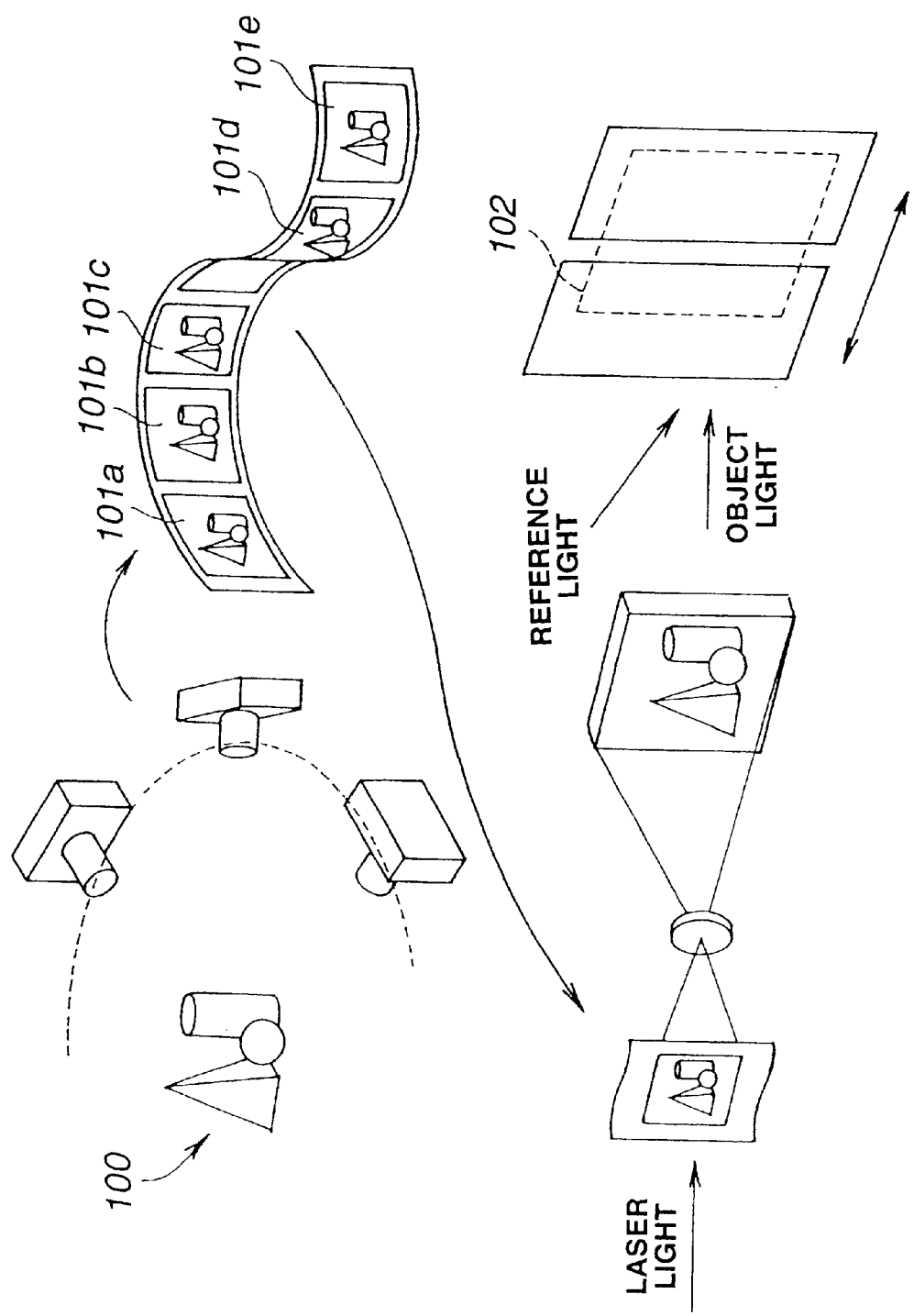
FIG. 1 is a view illustrating a method of preparing a holographic stereogram.
Figure 2:
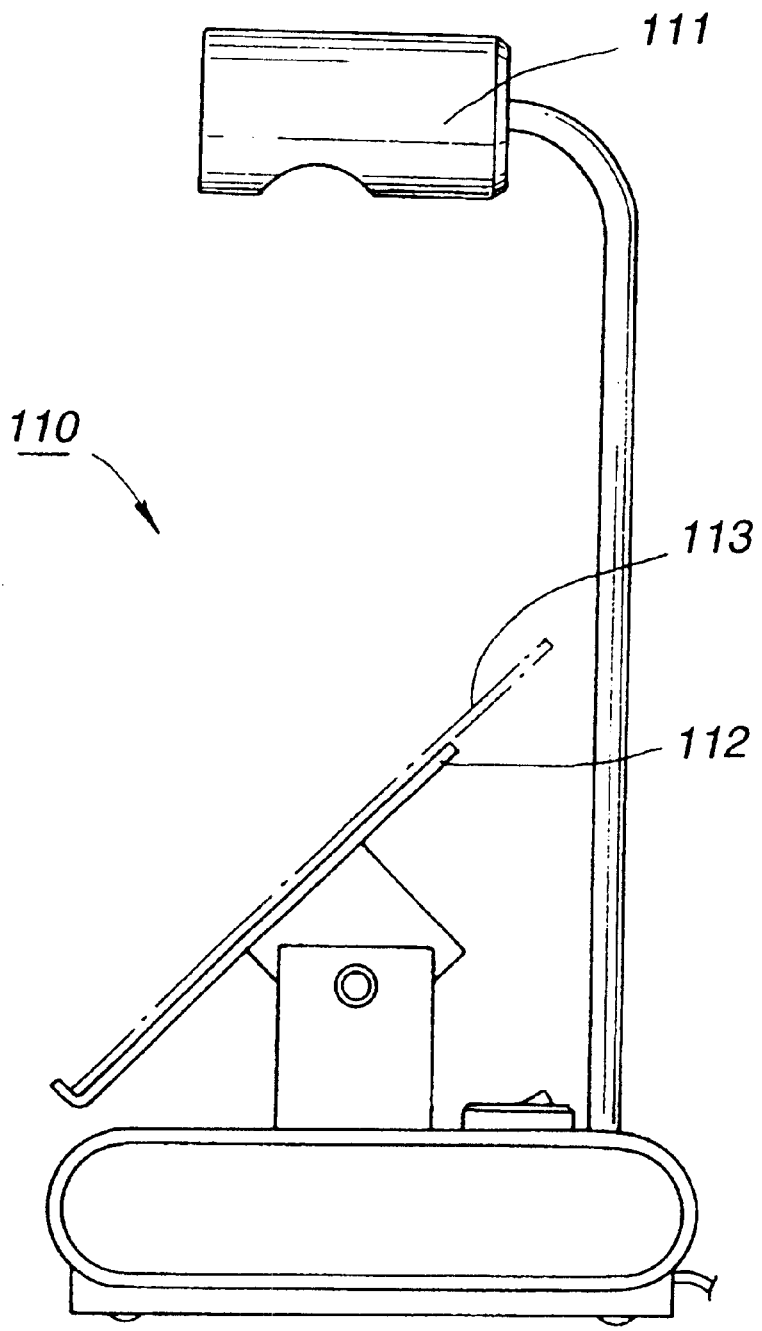
FIG. 2 is a side view showing a conventional image reproducing apparatus.

In the following, specific embodiments of the present invention will be explained in details with reference to the drawings. Note that the present invention is not limited to the following embodiments but the structure of the invention may be arbitrarily modified without deviating from the scope of the invention.

(First Embodiment)

FIGS. 3 to 6 show an image reproducing apparatus as a first embodiment to which the present invention is applied. This image reproducing apparatus 1 comprises an apparatus body 2 formed in a size which can be held by one hand and a movable section 3 movably attached to the apparatus body 2.

The apparatus body 2 is formed into a hollow box having a substantially rectangular outer shape, for example, by injection molding of synthetic resin material or the like. Further, a battery container section for containing a battery 4 to supply electric power to the light source 20 is provided inside the hollow apparatus body 2.

Also, a rotation shaft 5 is provided at the main surface portion 2a of the apparatus body 2. Further, a movable section 3 is attached to the apparatus body 2 such that the section is rotatable in the directions of the arrows A and B in FIG. 3 between a first position where the main surface section 2a of the apparatus body 2 is closed and a second position where it stands to be substantially vertical to the apparatus body 2 and the main surface section 2a of the apparatus body 2 is opened through the rotation shaft 5.

A container concave section 6 for receiving the side of the movable section 3 which opposes the main surface section 2a in the apparatus body 2 is provided in the form which corresponds to the outer shape of the movable section 3, when the movable section 3 is moved to the first position to close the main surface section 2a.

Also, a battery cover 7 for closing or opening the battery container section provided inside the apparatus body 2 is attached to the main surface section 2a of the apparatus body 2 such that the cover 7 can slide in relation to the apparatus body 2. A projection 8 is provided on the battery cover 7 so that the battery cover 7 can be easily slid and operated by fingers. In the image reproducing apparatus 1, when a battery is contained in the battery container section or a battery is replaced, the user hooks his or her finger on the projection 8 and slides the battery cover 7 in the direction of the arrow C in FIG. 3, to open the battery container section. The battery 4 is then contained or replaced, and further, the user then hooks his or her finger on the projection 8 again and slides the battery cover 7 in the direction of the arrow D in FIG. 3, to close the battery container section.

Also, in the image reproducing apparatus 1, a hologram attach section 10 where a hologram or a holographic stereogram is attached is provided on the surface of the battery cover 7 (a hologram, a holographic stereogram, or the like to be observed will be hereinafter called simply a hologram 9). Specifically, first and second hologram holding frame portions 11 and 12 are formed in parallel with each other, and a third hologram holding frame portion 13 corresponding to the length of the hologram 9 to be attached is positioned at the lower end portions of the first and second holding frame portions 11 and 12 such that the third hologram holding frame section is vertical to the portions 11 and 12. Further, by these first to third hologram holding frame portions 11, 12, and 13, a hologram attach section 10 for holding both the left and right ends and the lower end of the hologram 9.

To attach a hologram 9 to the hologram attach section 10, the hologram 9 is inserted between the first and second hologram holding frame portions 11 and 12 from the side of the upper ends of the first and second hologram holding frame portions 11 and 12, and is slid toward the side of the hologram holding frame portion 13, with the left and right end portions of the hologram held by the hologram holding frame portions 11 and 12. Further, the hologram 9 is pushed in until the lower end portion of the hologram 9 is held by the third hologram holding frame portion 13.

Note that it is desirable to adhere previously a black member which absorbs light on the back side of the hologram 9 when the hologram 9 is attached to the hologram attach section 10. By thus adhering a black member to the backside of the hologram 9, the contrast is improved when reproducing the hologram 9, so that an excellent reproduced image can be observed.

It is also desirable to construct the hologram attach section 10 such that not only one signal hologram 9 to be observed but also a plurality of holograms or holographic stereograms can be held simultaneously. If a plurality of holograms or holographic stereograms can thus be held, it is possible to observe a plurality of holograms or holographic stereograms by changing the plurality of holograms or holographic stereograms while carrying the image reproducing apparatus 1.

More specifically, if the hologram attach section 10 is constructed by the first to third hologram holding frame portions 11, 12, and 13 described above, the first to third hologram holding frames 11, 12, and 13 may be formed to be capable of holding a plurality of holograms or holographic stereograms layered in the thickness direction, and the plurality of holograms or holographic stereograms may be simultaneously attached to the hologram attach section 10 with the hologram 9 to be observed layered at the uppermost layer. At this time, it is desirable that a hologram press means such as a leaf spring or the like is provided on the surface of the battery cover 7, so that the holograms or holographic stereograms attached to the hologram attach section 10 are pressed toward the first to third hologram holding frame portions 11, 12, and 13. By thus pressing the holograms or holographic stereograms attached to the hologram attach section 10 toward the first to third hologram holding frame portions 11, 12, and 13, the holograms or holographic stereograms can be properly held by the first to third hologram holding frame portions 11, 12, and 13, even if a smaller number of holograms or holographic stereograms than a predetermined number are thus attached to the hologram attach section 10.

In addition, as a mechanism for keeping the plurality of holograms or holographic stereograms, a similar hologram holding section may be formed on the back side or the like of the battery cover 7. If a hologram holding section is formed on the backside or the like of the battery cover 7, it is possible to hold a much larger number of holograms or holographic stereograms.

Also, one sheet of hologram or holographic stereogram may be previously adhered to such a position on the surface of the battery cover 7 that corresponds to the hologram attach section 10. If one sheet of hologram of holographic stereogram is previously adhered to the position on the surface of the battery cover 7 that corresponds to the hologram attach section 10, this previously adhered hologram or holographic stereogram is reproduced when no hologram or holographic stereogram is attached to the hologram attach section 10, and another hologram 9 is reproduced when another hologram 9 is attached to the hologram attach section 10.

The movable section 3 is formed into a box-like shape substantially similar to that of the apparatus body 2 by injection molding of synthetic resin material or the like. Further, a light source 20 for irradiating illumination light to a hologram 9 attached to the hologram attach section 10 of the apparatus body 2 is provided inside the movable-section 3. An opening portion 21, which exposes the light source 20 provided inside the movable section 3 to the outside when the movable section 3 is moved to the first position, is provided in the opposed surface 3a of the movable section 3 which is opposite to the main surface 2a of the apparatus body 2. Further, the illumination light from the light source 20 is emitted to the outside of the movable section 3 through the opening portion 21 and irradiated onto the hologram 9 attached to the hologram attach section 10 of the apparatus body 2.

Also, on the opposed surface 3a of the movable section 3, there are provided a groove portion 22 for preventing the hologram holding frame portions 11, 12, and 13 provided on the main surface portion 2a of the apparatus body 2 from interfering with the opposed surface 3a of the movable section 3, when the movable section 3 is moved to the first position and contained in the apparatus body 2, and a concave portion 23 for preventing the projection 8 provided on the main surface portion 2a of the apparatus body 2 from interfering with the opposed surface 3a of the movable section 3.

As described above, the movable section 3 is attached to the apparatus body 2 so as to be movable between the first position where it is contained in the apparatus body 2 and the second position where it stands to be substantially vertical to the apparatus body 2. Further, the image reproducing apparatus 1 is arranged such that the illumination light emitted from the light source 20 is irradiated at a predetermined incidence angle to the hologram 9 attached to the hologram attach section 10 of the apparatus body 2 when the movable section 3 is positioned at the second position. That is, the light source 20 is provided in the movable section 3 at a position where the light source 20 is capable of irradiating illumination light at a predetermined incidence angle to the hologram 9 attached to the hologram attach section 10 of the apparatus section 2 when the movable section 3 is positioned at the second position.

A positioning projection 24 for positioning and fixing the movable section 3 at the second position is provided on the side surface portion of the movable section 3 in the side in which the section 3 is attached to the apparatus body 2. In addition, near the rotation shaft 5 of the apparatus body 2, there is provided a positioning concave portion 14 which is engaged with a positioning projection 21 provided on the movable section 3 when the movable section 3 is moved to the second position.

In this image reproducing apparatus 1, when the movable section 3 is moved to the second position, the positioning projection 24 provided on the movable section 3 is engaged with the positioning concave portion 14 provided in the apparatus body 2, thereby to position accurately the movable section 3 at the second position and the movable section 3 is kept positioned at the second position. Accordingly, in this image reproducing apparatus 1, when observing a hologram 9 attached to the hologram attach section 10, the position relationship between the hologram 9 and the light source 20 is maintained in an optimal condition, and illumination light from the light source 20 can be irradiated onto the hologram 9 constantly at a predetermined incidence angle.

Also, a pair of connection terminal portions 25 and 26 are provided and positioned in the left and right sides of the positioning projection 24 on the side surface portion 3b of the movable section 3, and form part of a switch mechanism for supplying or shutting off an electric power from a battery 4 provided inside the apparatus body 2 to the light source 20 provided inside the movable section 3. In addition, a pair of connection terminal portions 15 and 16 which constitute the switch mechanism, together with pair of connection terminal portions 15 and 16, are provided so as to correspond to the connection terminal portions 25 and 26. The connection portion of each of the connection terminal portions 25, 26, 15, and 16 is formed of a magnet, so that the one connection terminal portion 25 provided on the movable section 3 and the one connection terminal portion 15 provided on the apparatus body attract each other and the other connection terminal portion 26 provided on the movable section 3 and the other connection terminal portion 16 provided on the apparatus body 2 attract each other.

In this image reproducing apparatus 1, when the movable section 3 is moved to the second position, the positioning projection 24 is engaged in the positioning concave portion 14 provided in the apparatus body 2, and when the movable section 3 is positioned at the second position, the pair of connection terminal portions 15 and 16 provided on the movable section 3 are connected with the pair of connection terminal portions 25 and 26 provided on the apparatus body 2. In this manner, the electric power from the battery 4 contained in the apparatus body 2 is supplied to the light source 20 provided in the movable section 3. Also, in this image reproducing apparatus 1, when the movable section 3 is moved toward the first position from the second position, the pair of connection terminal portions 15 and 16 are moved apart from the pair of connection terminal portions 25 and 26 provided on the apparatus body 2, so that the electric power from the battery 4 contained in the apparatus body 2 is shut off by the connection terminal portions 15 and 16 and prevented from being supplied to the light source 20 provided in the movable section 3. Therefore, in this image reproducing apparatus 1, the electric power is supplied to the light source 20 and illumination light is emitted only when the movable section 3 is positioned at the second position and a hologram 9 attached to the hologram attach section 10 of the apparatus body 2 is observed. Accordingly, the electric power consumption can be saved.

Figure 3:
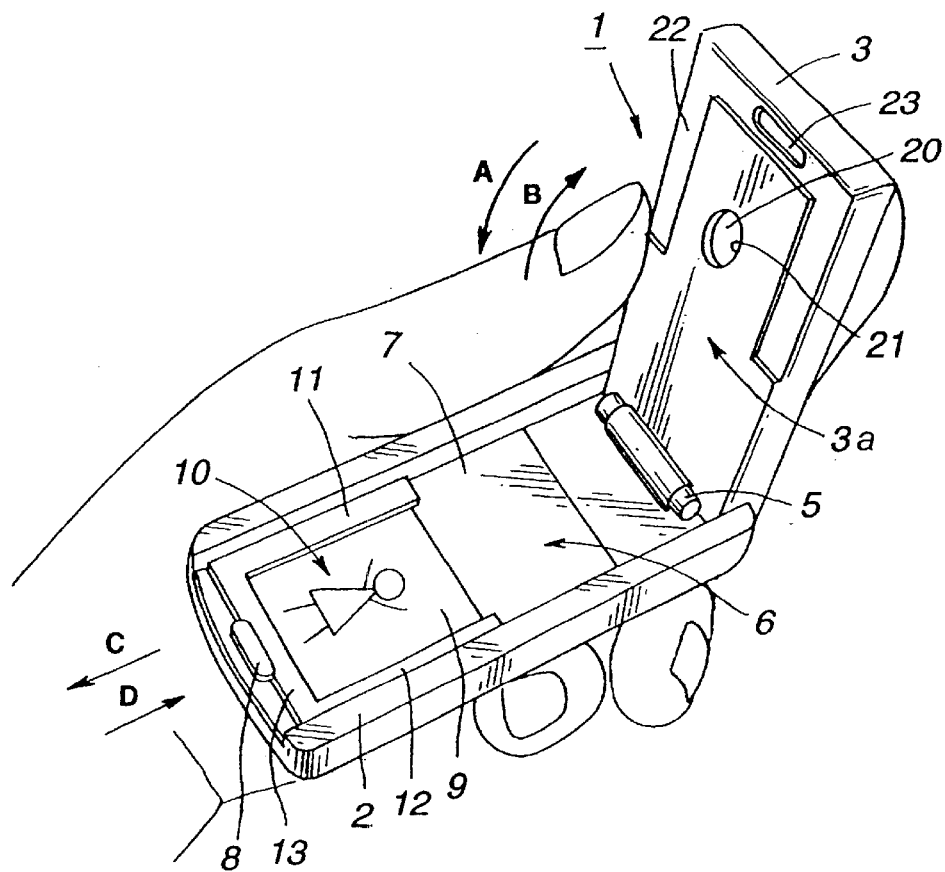
FIG. 3 is a perspective view showing an image reproducing apparatus according to the first embodiment to which the present invention is applied.
Figure 4:
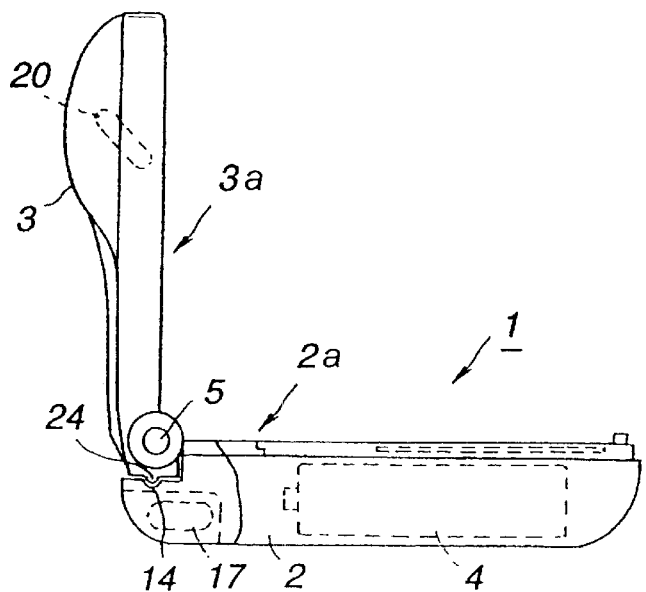
FIG. 4 is a side view showing the image reproducing apparatus which is partially cut away, where the movable section is positioned at the second position.
Figure 5:
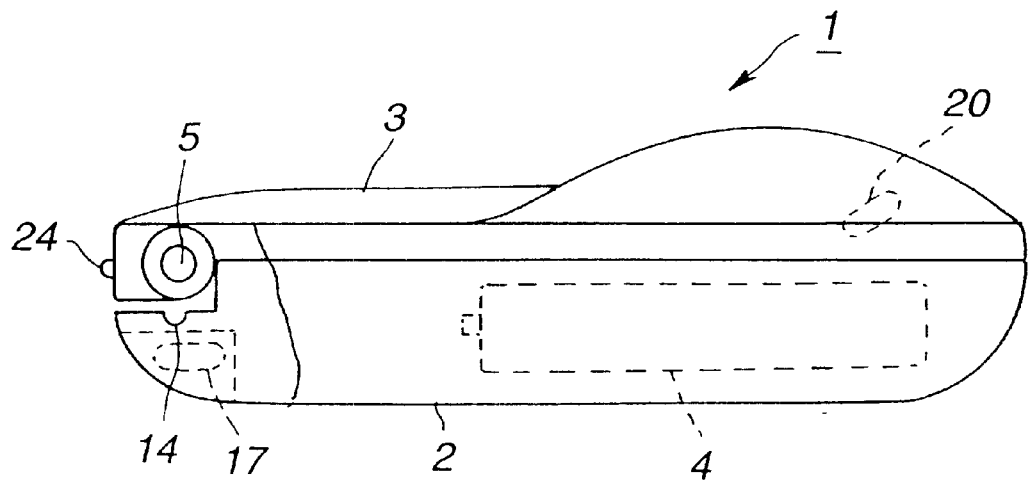
FIG. 5 is a side view showing the image reproducing apparatus which is partially cut away, where the movable section is positioned at the first position.
Figure 6:
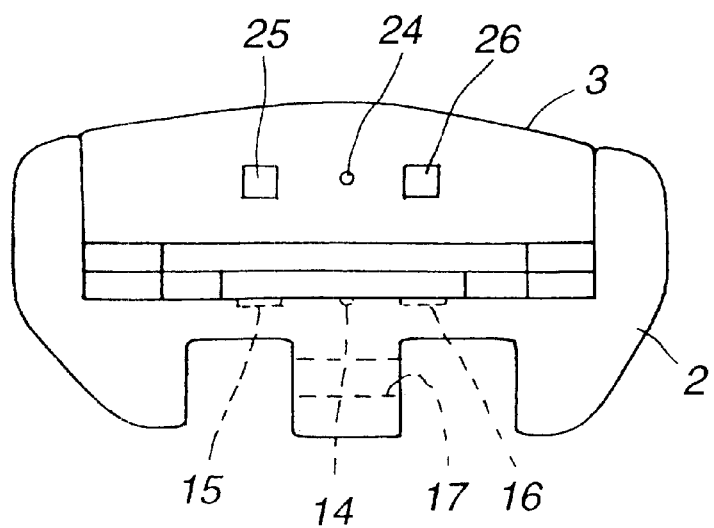
FIG. 6 is a side view of the image reproducing apparatus from its backside.

In the image reproducing apparatus 1 constructed as described above, the movable section 3 is rotated in the direction of the arrow A shown in FIG. 3 about the rotation shaft 5 provided in the apparatus body 2 as the center of rotation and the rotatable section 3 is moved to the first position while a hologram is not observed. When the movable section 3 is moved to the first position, the opposed surface 3a of the movable section 3 is contained in the container concave portion 6 provided in the main surface portion 2a of the apparatus body 2, thereby to close the main surface portion 2a of the apparatus body 2. In this manner, a hologram 9 attached to the hologram attach section 10 of the apparatus body 2 and the light source 20 provided in the movable section 3 is protected.

Also, in the image reproducing apparatus 1, the movable section 3 is moved to the first position, and the opposed surface 3a side of the movable section 3 is thereby contained in the container concave portion 6 provided in the main surface portion 2a of the apparatus body 2, so that the outer shape becomes smallest and compact. The portability is thus improved.

Note that a through-hole 17 to which a strap or another ornament is attached should preferably be provided at a side surface portion or the like of the apparatus body 2 or the like, in this image reproducing apparatus 1. If a through hole 17 is thus provided for the apparatus body 2 so that a strap or the like can be attached to the apparatus body 2, the portability can be improved much more and an added value can be provided for the apparatus.

Also, this image reproducing apparatus 1 should preferably be provided with a mechanism for positioning and holding the movable section 3 at the first position when the movable section 3 is moved to the first position. For example, a projection 8 for sliding the battery cover 7 of the apparatus body 2 when the movable section 3 is moved to the first position may be engaged with a concave portion 23 provided in the opposed surface 3a of the movable section 3, so that the movable section 3 is held at the first position. By thus comprising a mechanism for holding the movable section 3 at the first position, the image apparatus 1 can avoid the problem that the movable section 3 may rotate unintentionally while carrying the apparatus 1.

When observing a hologram 9 attached to the hologram attach section 10 of the apparatus body 2, the image reproducing apparatus 1 rotates the movable section 3 in the direction of the arrow B shown in FIG. 3 about the rotation shaft 5 provided in the apparatus body 2 as the center of rotation, thereby to move the movable section 3 to the second position. When the movable section 3 is moved to the second position, the positioning projection 24 is engaged in the positioning concave portion provided in the apparatus body 2, to be positioned at the second position, so that this state is maintained.

Also, if the movable section 3 is positioned at the second position, the connection terminal portions 25 and 26 provided on the movable section 3 are connected respectively with the connection terminal portions 15 and 16, so that the electric power from the battery 4 contained in the apparatus body 2 is supplied to the light source 20 provided in the movable section 3. As a result, illumination light is emitted from the light source 20 with the movable section 3 positioned at the second position and is irradiated at a predetermined incidence angle onto the hologram 9 attached to the hologram attach portion 10 of the apparatus body 2.

If light such as room illumination light, sun light, or the like other than the illumination light from the light source 20 is irradiated onto the hologram 9 to be observed, a double image is reproduced and the contrast is lowered, thereby making it difficult to observe the hologram 9 with excellent conditions. However, in the present image reproducing apparatus 1, since the hologram 9 is observed when the movable section 3 is positioned at the second position where it is substantially vertical to the apparatus body 2, the movable section 3 can have a function of blocking light other than the light from the light source 20, so that an excellent reproduced image can be observed.

Note that the above description has been made of an example in which the apparatus body 2 is provided with a hologram attach section 10 where a hologram 9 is attached and a light source 20 is provided in the movable section 3. However, the image reproducing apparatus according to the present invention is not limited to the above example but the light source 20 may be provided in the apparatus body 2 and the hologram attach section 10 may be provided in the movable section 3, so that illumination light is irradiated from the apparatus body 2 side onto a hologram 9 attached to the movable section 10 provided in the movable section 3. In this case, the illumination light is irradiated obliquely from the downside onto the hologram 9 attached to the hologram attach section 10. However, the hologram 9 can be excellently reproduced by manufacturing the hologram 9 such that the hologram can be reproduced with illumination light obliquely from the downside. Also, if illumination light is thus irradiated onto the hologram 9 obliquely from the downside, the hologram 9 is not reproduced by the light irradiated obliquely from the upside, and therefore, it is possible to avoid previously the problem that the hologram 9 is reproduced by other light such as room illumination light, sun light, or the like than the illumination light and a double image is thereby observed. Accordingly, an excellent reproduced image is obtained.

Figure 7:
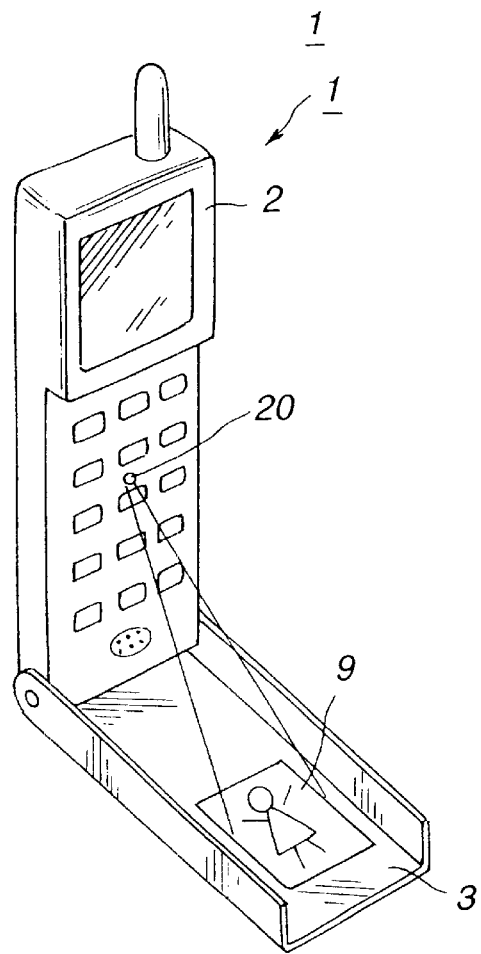
FIG. 7 is a perspective view showing another example of the image reproducing apparatus.

Also, the image reproducing apparatus 1 according to the present invention may have, for example, a function as a portable telephone in addition to functions as described above, as shown in FIG. 7. In this case, if a hologram 9 in which the portrait of a person on the opposite side on the telephone is recorded is attached to the hologram attach section 10, conversation can be made while imaging the person on the telephone.

Figure 8:
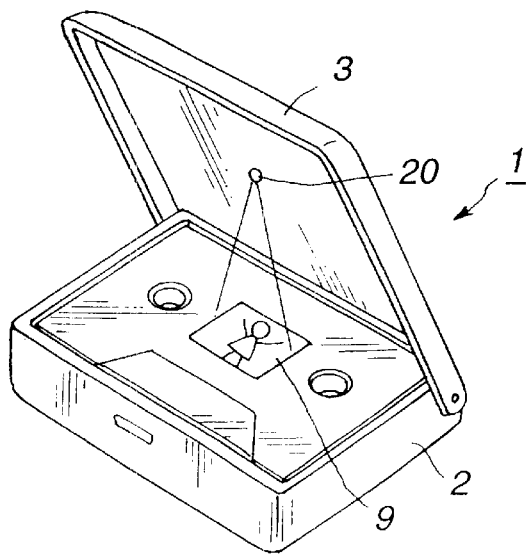
FIG. 8 is a perspective view showing further another example of the image reproducing apparatus.

Also, the image reproducing apparatus 1 according to the present invention may have a function as a portable recording/reproducing apparatus for recording/reproducing music data or the like on a recording medium such as a cassette tape or the like, in addition to functions as described above, as shown in FIG. 8. In this case, for example, if a hologram 9 in which the portrait or the like of the composer of the music data is recorded is adhered on a cassette tape or the like and this cassette tape or the like is attached to the apparatus body, music data can be recorded/reproduced while imaging the composer of the music data or the like.

(Second Embodiment)

Figure 9:
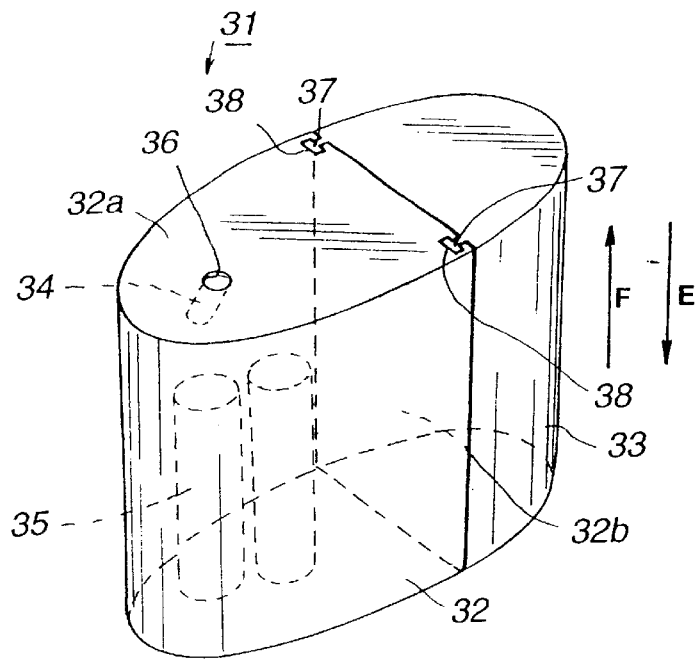
FIG. 9 is a perspective view showing an image reproducing apparatus according to the second embodiment to which the present invention is applied, where the movable section is positioned at the first position.
Figure 10:
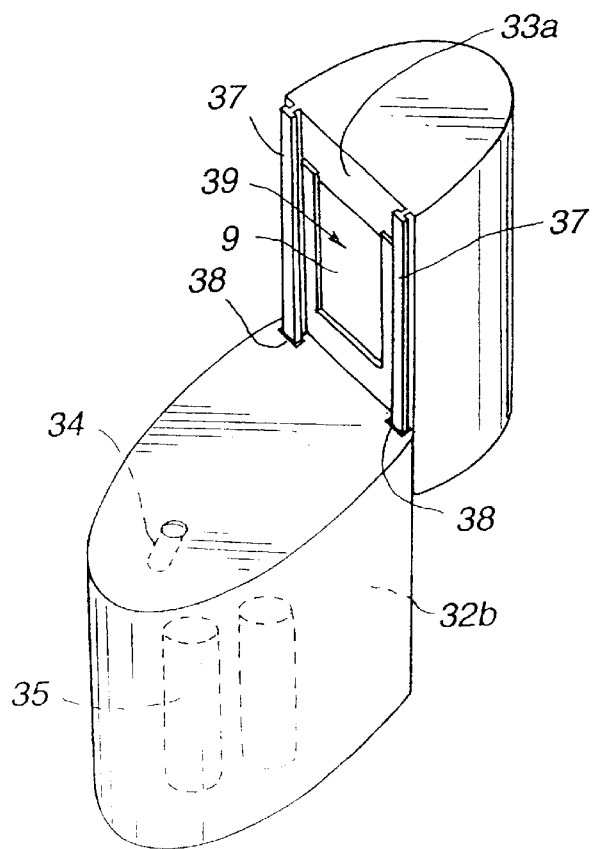
FIG. 10 is a perspective view showing the image reproducing apparatus where the movable section is positioned at the second position.

FIGS. 9 and 10 show an image reproducing apparatus according to the second embodiment to which the present invention is applied. This image reproducing apparatus 31 comprises an apparatus body 32 formed to have a size which can be held by one hand, and a movable section 33 movably attached to the apparatus body 32. Further, the image reproducing apparatus 31 according to the second embodiment is characterized in that the movable section 33 is engaged with the apparatus body 32 such that the movable section 33 can slide on the apparatus body 32. Note that the image reproducing apparatus 31 according to the second embodiment has a basic structure similar to that of the image reproducing apparatus 1 according to the first embodiment. Therefore, specific explanation will be omitted with respect to the same structure as that of the first embodiment.

The image reproducing apparatus 31 according to the second embodiment is formed, as a whole, in a columnar shape having a substantially elliptic cross-section. Further, this image reproducing apparatus 31 is divided into two parts by a plane parallel to the height direction of the columnar shape. One of the two parts forms the apparatus body 32 and the other forms the movable section 33.

The apparatus body 32 is hollow inside and a battery container section for containing a battery 35 for supplying the light source 34 with electric drive power is formed in the hollow inside space. Battery 35 is contained in the battery container section. In addition an opening portion 36 which exposes the top end of the light source 34 provided in the apparatus body 32 to the outside is formed in the upper surface 32*a* of the apparatus body 32.

The movable section 33 is engaged with the apparatus body 32 such that the movable section 33 can slide on the apparatus body 32. More specifically, for example, an engaging projection portion 37 projecting toward the apparatus body 32 is provided on an opposed surface 33*a* of the movable section 33 which is opposed to the apparatus body 32, and an engaging groove portion 38 is provided on an opposed surface 32*b* of the apparatus body 32 which is opposed to the movable section 33, over the entire moving region of the movable section 33. Further, the movable section 33 is attached to the apparatus body 32 such that the movable section 33 can slide on the apparatus body 32 in the directions of the arrows E and F in FIG. 9 between first and second positions. At the first position, the engaging projection portion 37 provided on the opposed surface 33*a* of the movable section 33 which is opposed to the apparatus body 32 is engaged with the engaging groove portion 38 provided in the opposed surface 32*b* of the apparatus body 32 which is opposed to the movable section 33, so that the opposed surface 33*a* of the movable section 33 and the opposed surface 32*b* of the apparatus body 32 are faced to each other. Meanwhile, at the second position, the opposed surface 33*a* of the movable section 33 and the opposed surface 32*b* of the apparatus body 32 are exposed. Note that the method in which the movable section 33 is attached to the apparatus body 32 is not limited to the example described above but the movable section 33 can be attached thereto by any method as long as the movable section 33 can slide on the apparatus body 32.

A hologram attach section 39 is provided on the opposed surface 33*a* of the movable section 33. Further, a hologram 9 to be observed is attached to the hologram attach section 39. Further, in the image reproducing apparatus 31, illumination light from the light source 34 provided in the apparatus body 32 is irradiated at a predetermined incidence angle onto the hologram 9 attached to the hologram attach section 39 of the movable section 33 when the movable section 33 is slid in the direction of the arrow F in FIG. 9 so as to be positioned at the second position.

In this image reproducing apparatus 31, since the illumination light from the light source 34 is irradiated obliquely from the downside to the hologram 9 attached to the hologram attach section 39, it is possible to observe an excellent reproduced image if the hologram 9 is manufactured to be reproduced by the illumination light irradiated obliquely from the downside. In the case where illumination light is irradiated onto the hologram 9 to be observed, the hologram 9 cannot be reproduced by light irradiated obliquely from the upside but is reproduced by light other than the illumination light, such as room illumination light, sun light, and the like, so it is possible to avoid the problem of a double image being observed. Thus, a particularly excellent reproduced image can be obtained by this image reproducing apparatus 31.

In the image reproducing apparatus 31 constructed as described above, the movable section 33 is slid in the direction of the arrow E in FIG. 9 and moved to the first position, when observation is not carried out. When the movable section 33 is moved to the first position, the opposed surface 33*a* is faced to the opposed surface 32*b* of the apparatus body 32 and thereby contained in the apparatus body 32. Accordingly, this image reproducing apparatus 31 is capable of protecting the hologram 9 attached to the hologram attach section 39 of the movable section 33 and of simultaneously minimizing the outer shape to improve the portability while observation is not carried out.

Also, in the image reproducing apparatus 31, the movable section 33 is slid in the direction of the arrow F in FIG. 9 to be moved to the second position during observation. When the movable section 33 is moved to the second position, the illumination light from the light source 34 provided in the apparatus body 32 is irradiated at a predetermined incidence angle onto the hologram 9 attached to the hologram attach section 39 of the movable section 33. Accordingly, in this image reproducing apparatus 31, the hologram 9 attached to the hologram attach section 39 is properly reproduced.

Needless to say, the same advantages as those of the hologram reproducing apparatus 1 according to the first embodiment can be obtained if the present image reproducing apparatus 31 is arranged so as to comprise a mechanism for positioning the movable section 33 to the first or second position, a switching mechanism for switching the power supply to the light source 34, a mechanism for holding a plurality of holograms, and the like, like in the image reproducing apparatus according to the first embodiment as described above.

(Third Embodiment)

Figure 11:
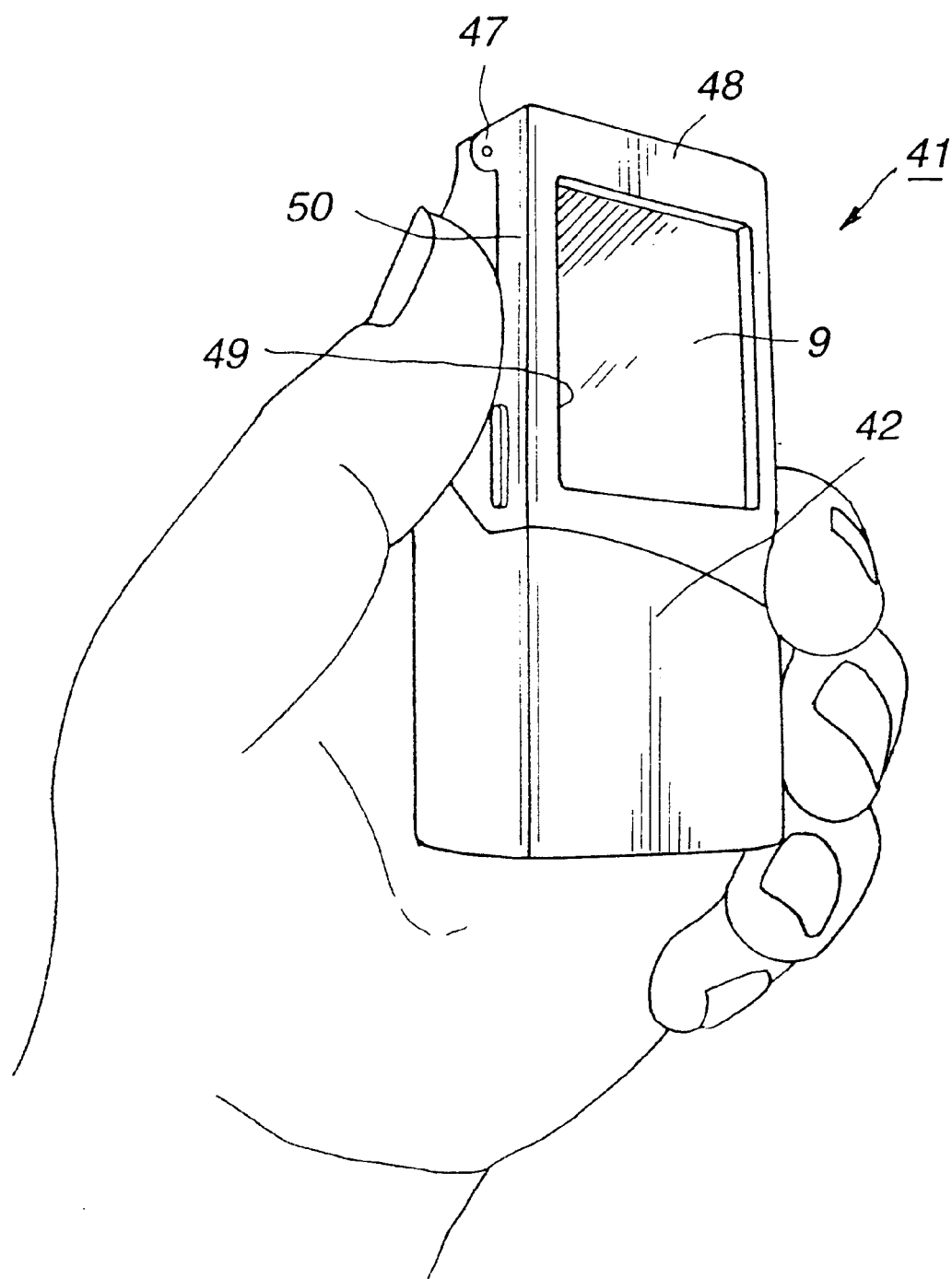
FIG. 11 is a perspective view showing an image reproducing apparatus according to the third embodiment.
Figure 12:
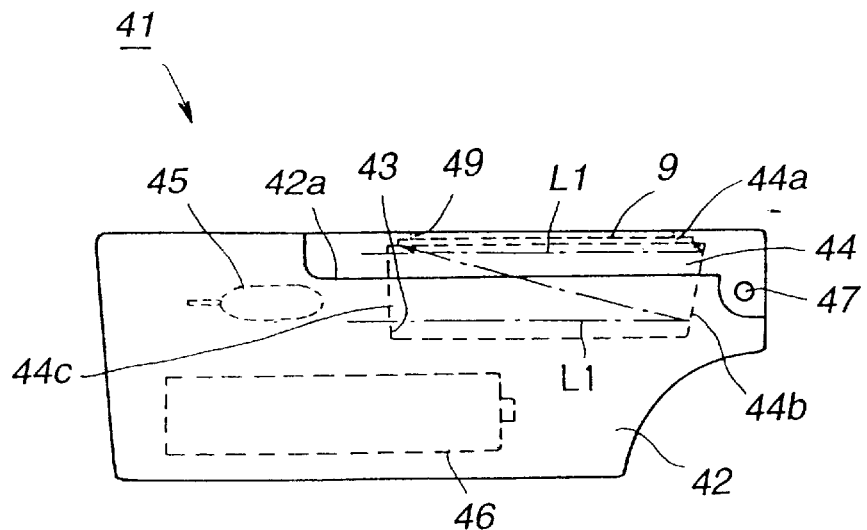
FIG. 12 is a side view of the image reproducing apparatus where the hologram holding section is closed.
Figure 13:
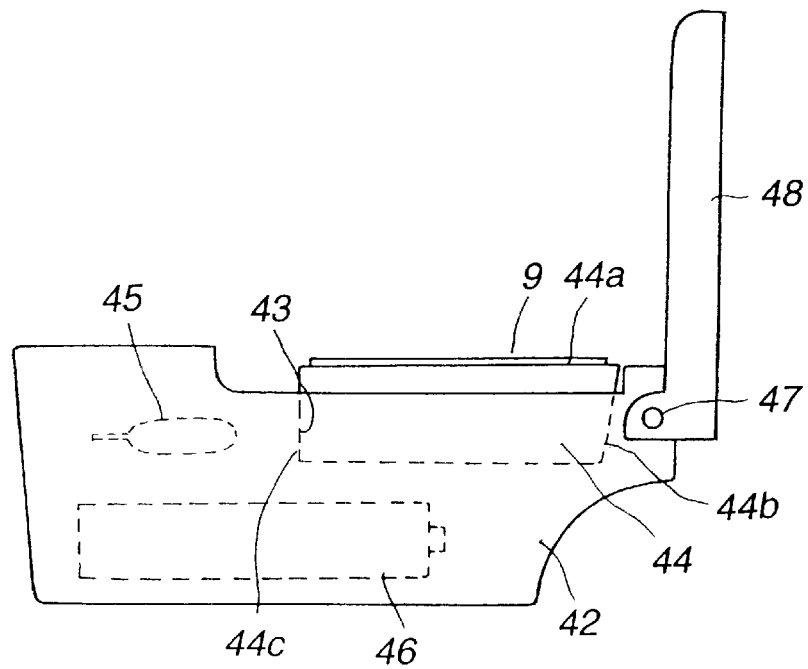
FIG. 13 is a side view of the image reproducing apparatus where the hologram holding section is opened.

FIGS. 11 to 13 show an image reproducing apparatus according to the third embodiment to which the present invention is applied. This image reproducing apparatus 41 is arranged so as to reproduce a hologram 9 as a so-called edge-lit hologram and comprises an apparatus body 42 formed in the shape which can be held by one hand.

In the apparatus body 42, a concave portion 43 is formed along an intermediate portion in the thickness direction from the main surface portion 42*a* of the apparatus body 42. An illumination light transmission member 44 made of material such as glass or the like which transmits light is contained in this concave portion 43. This illumination light transmission member 44 is formed by shaping glass into a 3 substantial rectangular parallelepiped, and is contained in the concave portion 43 such that one surface 44*a* thereof is faced to the outside of the apparatus body 42.

Further, this image reproducing apparatus 41 is constructed such that a hologram 9 to be observed is adhered onto the surface 44*a* of the illumination light transmission member 44 faced to the outside by an index matching liquid or the like, as the occasion demands.

Also, the illumination light transmission member 44 has an end surface 44*b* which is inclined at a predetermined angle and reflects illumination light entering into the illumination light transmission member 44, on the end surface 44*b*, thereby to make the light irradiated at a predetermined angle onto the hologram 9 adhered on the one surface 44*a*. Note that a reflection film made of aluminum or the like which has a high reflection ratio may desirably be formed on the one end surface of the illumination light transmission member 44, to improve the reflection ratio with respect to the illumination light.

In the apparatus body 42, a light source 45 for emitting illumination to be irradiated onto the hologram 9 adhered on one surface 44*a* of the illumination transmission member 44 is provided at a position near the illumination light transmission member 44 contained in the concave portion 43. Further, a battery container section for containing a battery 46 for supplying a drive electric power to the light source 45 is formed in the apparatus body 42, and the battery 46 is contained in this battery container section.

In addition, a rotation shaft 47 is provided at an end portion of the apparatus body 42, and a hologram holding member 48 for holding an end portion of a hologram 9 adhered on one surface 44a of the illumination light transmission member 44 is attached to the apparatus body 42 so as to be rotatable with respect to the apparatus body 42. An opening portion 48 having an opening diameter slightly smaller than the outer shape of the hologram 9 adhered on the one surface 44a is formed in the hologram holding member 48. Further, area along the end edge of this opening portion 48 is formed as a hologram holding portion for holding an end portion of the hologram 9.

When the hologram holding member 48 is rotated in the direction in which the main surface portion 42a of the apparatus body 42 is closed, the hologram holding portion 50 makes contact with the illumination light transmission member 44 through an end portion of the hologram 9 adhered on the one surface 44a of the illumination transmission member 44. In this manner, an end portion of the hologram 9 is inserted between the hologram holding member 48 and the illumination light transmission member 44, so that the hologram 9 is held on the one surface 44a of the illumination transmission member 44. At this time, the other portions of the hologram 9 than the end portions of the hologram 9 are exposed to the outside through the opening portion 49 provided in the hologram holding member 48.

In addition, if the hologram holding member 48 is rotated in the direction in which the main surface portion 42a of the apparatus body 42 is opened, the holding of the hologram 9 is released so that replacement or attachment of the hologram 9 is enabled.

When a hologram 9 is reproduced by the image reproducing apparatus 41 constructed as described above, the hologram 9 is adhered onto one surface 44a of the illumination light transmission member 44, at first, and the hologram holding member 48 is rotated in the direction in which the main surface portion 42a of the apparatus body 42 is closed, thereby to hold the hologram 9 on one surface 44a of the illumination light transmission member 44. At this time, the hologram 9 may be attached to the image reproducing apparatus 41 in a manner in which the illumination light transmission member 44 to which the hologram 9 is previously adhered is contained in the concave portion 43 provided in the apparatus body 42.

Further, the electric power supplied from the battery 46 contained in the battery container section is supplied to the light source 45. In this manner, illumination light is emitted from the light source 45.

The illumination light L1 emitted from the light source 45 enters into the illumination light transmission member 44 from the end surface 44c of the illumination light transmission member 44 which is opposed to the light source 45. Further, the illumination light L1 which enters into the illumination light transmission member 44 is reflected on the end surface 44b used as an inclined surface, and is irradiated at a predetermined incidence angle onto the hologram 9 adhered on the surface 44a of the illumination light transmission member 44. In this manner, the hologram 9 is formed as a so-called edge-lit type hologram.

As has been described above, this image reproducing apparatus 41 reflects the illumination light emitted from the light source 45 on the end surface 44b, so that illumination light is irradiated at a predetermined incidence angle onto the hologram 9. Therefore, an excellent image can be obtained.

Also, in this image reproducing apparatus 41, the illumination light to be irradiated onto the hologram 9 is reflected on the end surface 44b of the illumination light transmission member 44, thereby to bend the light passage thereof to be irradiated onto the hologram 9. Therefore, the entire apparatus can be downsized while maintaining a length of the light passage of the illumination light which is necessary to reproduce the hologram 9 excellently.

In particular, in this image reproducing apparatus 41, a battery container section or the like for containing the illumination light transmission member 44 to which the hologram 9 is adhered and the light sources 45 and 46 for emitting illumination light to be irradiated onto the hologram 9 is provided in the apparatus body 42 shaped in a small size which can be held by one hand. The apparatus itself has a compact shape as a whole, and excellent portability is therefore realized.

Needless to say, the same advantages as obtained by the hologram reproducing apparatus 1 according to the first embodiment can be obtained if this image reproducing apparatus 41 is arranged so as to comprise a switching mechanism for switching the power supply to the light source 45 and a mechanism for holding a plurality of holograms, like the image reproducing apparatus 1 according to the first embodiment as described above.

(Fourth Embodiment)

Figure 14:
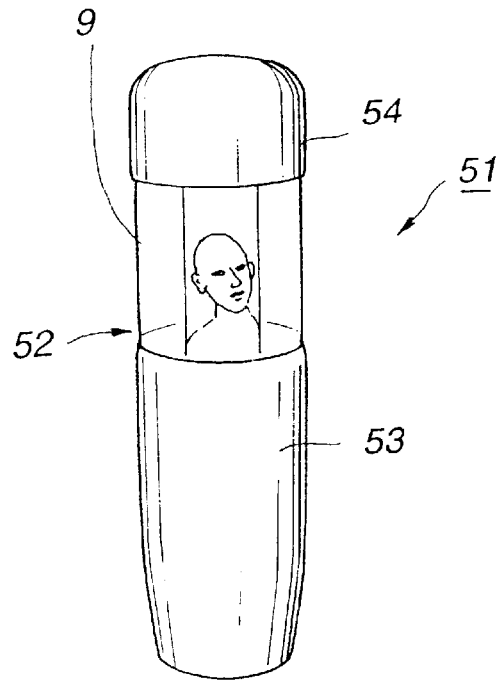
FIG. 14 is a perspective view showing an image reproducing apparatus according to the fourth embodiment to which the present invention is applied.
Figure 15:
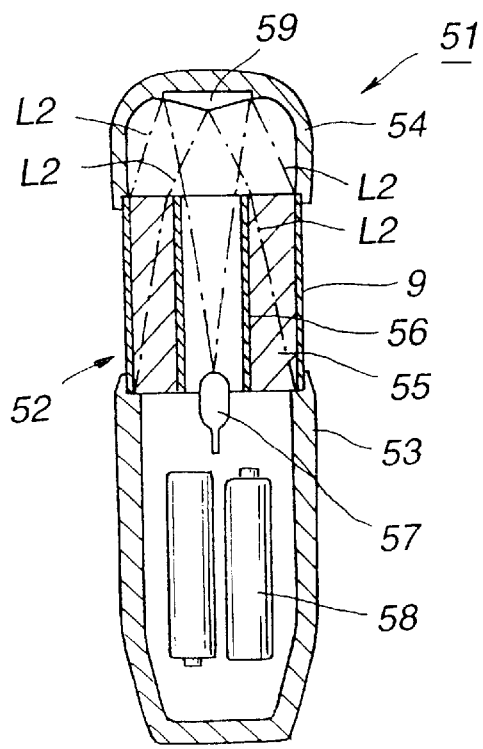
FIG. 15 is a longitudinal cross-sectional view showing the image reproducing apparatus.

FIGS. 14 and 15 show an image reproducing apparatus according to the fourth embodiment to which the present invention is applied. This image reproducing apparatus 51 is constructed so that a cylindrical hologram or cylindrical holographic stereogram can be reproduced (a cylindrical hologram and a cylindrical holographic stereogram will be each called simply a cylindrical hologram). The image reproducing apparatus 51 is formed in a substantially cylindrical shape, both ends of which are closed, and has a size which can be held by one hand.

The apparatus body 52 comprises a base section 53 and a cover member 54, and a cylindrical hologram is attached between the base section and the cover member 54. That is, in this image reproducing apparatus, the region between the base section 53 and the cover member 54 is constructed as a hologram attach section.

The cylindrical hologram to be attached to the hologram attach section of the apparatus body is formed by adhering a hologram 9 to be observed onto the outer circumferential surface of the base body 55 made of a member such as acrylic resin or the like which transmits light and formed in a cylindrical shape. The hologram is attached between the base section 53 and the cover member 54 in a manner in which one end portion of the hologram is engaged with the base section 53 of the apparatus body 52 while the other end portion thereof is engaged with the cover member 54 of the apparatus body 52. Further, since this cylindrical hologram is thus attached between the base section 53 and the cover member 54, the hologram 9 attached onto the outer circumferential surface of the base body 55 is exposed to the outside from the circumferential surface of the apparatus body 52.

Also, a light absorbing member 56 such as a black carbon film or the like for absorbing illumination light irradiated onto the hologram 9 is provided on the inner circumferential surface of the base body 55. This light absorbing member 56 absorbs an unnecessary portion of the illumination light which passes through inside of the base body 55 formed in a cylindrical shape, thereby to prevent this illumination light from entering into the base body 55 from other portions than a predetermined portion of the base body 55.

A light source 57 for emitting illumination light to be irradiated onto the hologram 9 adhered onto the outer circumferential surface of the base body 55 is provided inside the base section 53 of apparatus body 52. In addition, a battery container section for containing a battery 58 for supplying a drive electric power to the light source 57 is formed inside the base section 53, and the battery 58 is contained in this battery container section.

Also, a light passage bending mirror 59 for reflecting the illumination light emitted from the light source 57 the cover member 54 of the apparatus body 52 is provided inside the cover member 54 of the apparatus body 52. This light passage bending mirror 59 is formed, for example, in a conical shape, and is provided at a position opposed to the light source 57 inside the cover member 54. This mirror 59 reflects the illumination light which is emitted from the light source 57 and passes through the inside of the cylindrical hologram, thereby to irradiate the illumination light at a predetermined incidence angle onto the hologram 9 adhered onto the outer circumferential surface of the base body 55.

When a cylindrical hologram is reproduced by the image reproducing apparatus 51 constructed as described above, the cylindrical hologram is attached to the hologram attach section of the apparatus body 52. At this time, the base body 55 forming the cylindrical hologram may be previously attached to the hologram attach section, and a hologram 9 to be observed may be adhered onto the outer circumferential surface of the base body 55 attached to the hologram attach section during observation.

Further, the power from the battery 58 contained in the battery container section is supplied to the light source 57. Illumination light is then emitted from the light source 57.

The illumination light L2 emitted from the light source 57 is reflected by the light passage bending mirror 59 provided at the position opposed to the light source 57, as shown in FIG. 15, and then enters into the base body 55 from one end portion of the base body 55. Further, the illumination light L2 which thus enters into the base body 55 passes through the base body 55 and is irradiated at a predetermined incidence angle onto the hologram 9 adhered on the outer circumferential surface of the base body 55. In this manner, the hologram 9 adhered on the outer circumferential surface of the base body 55 is reproduced and a reproduced image is observed from the outer circumferential surface of the apparatus body 52.

As has been described above, this image reproducing apparatus 51 is arranged such that illumination light emitted from the light source 57 is reflected on the light passage bending mirror 59 and enters at a predetermined incidence angle onto the hologram adhered on the outer circumferential surface of the base body 55. Therefore, an excellent reproduced image can be obtained.

In addition, in this image reproducing apparatus 51, since the illumination light to be irradiated onto the hologram 9 is reflected by the light passage bending mirror 59, the light passage is bent so that the illumination light is irradiated onto the hologram 9. It is therefore possible to realize downsizing of the entire apparatus while maintaining the light passage length of the illumination light that is necessary to reproduce the hologram 9 excellently.

In particular, in this image reproducing apparatus 51, the light source 57 for emitting illumination light, the battery container section for containing a battery 58, and the like are provided in the apparatus body 52 formed to have a size which is small enough to hold by one hand. Accordingly, the image reproducing apparatus 51 has a compact shape as a whole, so that excellent portability is realized.

Also, this image reproducing apparatus 51 reproduces a cylindrical hologram which is formed by adhering a hologram 9 on the outer circumferential surface of the base body formed in a cylindrical shape, and the reproduced image is observed from the circumferential surface of the apparatus body 52. Therefore, it is possible to observe very three-dimensional image.

Needless to say, the same advantages as obtained by the hologram reproducing apparatus 1 according to the first embodiment can be obtained if the image reproducing apparatus 51 is arranged so as to comprise a switching mechanism for switching the power supply to the light source 57 and a mechanism for holding a plurality of holograms, like the image reproducing apparatus 1 according to the first embodiment as described above.

What is claimed is:

1. A holographic stereogram image reproducing apparatus, the holographic stereogram comprising a plurality of hologram elements that are generated using a plurality of different images, the apparatus comprising:
    an apparatus body,
    a movable section connected to the apparatus body such that the movable section is movable, while the apparatus body remains in a fixed position, between a first position where the movable section abuts the apparatus body, such that the holographic stereogram is in a non-optimal-viewing position, and a second position in which the holographic stereogram is viewable;
    an attach section to which the holographic stereogram is attached such that the holographic stereogram is secured flatly against one of the apparatus body and the movable section, said attach section being provided exclusively in one of the apparatus body and the movable section; and
    a light source emitting illumination light to be irradiated at a predetermined incidence angle onto the holographic stereogram attached to the attach section.

2. A holographic stereogram image reproducing apparatus according to claim 1, further comprising:
    electric power supply means for supplying electric power to the light source, the electric power supply means being provided in one of the apparatus body and the movable section.

3. A holographic stereogram image reproducing apparatus according to claim 2, further comprising:
    switching means for electrically connecting the electric power supply means and the light source when the movable section is in the second position, and for electrically disconnecting the electric power supply means and the light source when the movable section is not in the second position.

4. A holographic stereogram image reproducing apparatus according to claim 1, further comprising a position mechanism for positioning the movable section to the second position.

5. A holographic stereogram image reproducing apparatus according to claim 1, wherein
    the light source is positioned above the holographic stereogram attached to the attach section when the movable section is in the second position, and
    the holographic stereogram to be attached to the attach section is configured so that an image can be reproduced with the illuminating light irradiated above it.

6. A holographic stereogram image reproducing apparatus according to claim 1, wherein said attach section comprises a U-shaped member having a plurality of holding frame portions, and said holographic stereogram being slidably insertable into, and slidably removable from, said holding frame portions, whereby said holding frame portions secure the holographic stereogram against one of the apparatus body and the movable section.

7. A holographic stereogram image reproducing apparatus according to claim 1, wherein said non-optimal-viewing position is a non-viewing position.

8. An image reproducing apparatus comprising:

an apparatus body;

an attach section provided in the apparatus body, to which a hologram or holographic stereogram is attached;

a light source provided in the apparatus body, for emitting illumination light to be irradiated onto the hologram or holographic stereogram attached to the attach section; and light transmission means provided in a path of the illumination light emitted from the light source in the apparatus body, for reflecting the illumination light emitted from the light source, thereby to irradiate the illumination light at a predetermined angle to the hologram or holographic stereogram attached to the attach section.

9. An image reproducing apparatus according to claim 8, wherein the reflected illumination light is irradiated at the predetermined angle through a rear side of the hologram or holographic stereogram.

10. An image reproducing apparatus according to claim 8, wherein the attach section comprises a cover member for clamping the hologram or holographic stereogram in between the cover member and the apparatus body when the cover member is closed.

11. A holographic stereogram image reproducing apparatus, the holographic stereogram comprising a plurality of hologram elements that are generated using a plurality of different images, the apparatus comprising:

an apparatus body, movable member means connected to the apparatus body such that the movable member means is movable, while the apparatus body remains in a fixed position, between a first position where the movable member means abuts the apparatus body such that the holographic stereogram is in a non-optimal-viewing position, and a second position in which the holographic stereogram is viewable;

attachment means to which the holographic stereogram is attached such that the holographic stereogram is secured flatly against one of the apparatus body and the movable member means, said attachment means being provided exclusively in one of the apparatus body and the movable member means; and light source means for emitting illumination light to be irradiated at a predetermined incidence angle onto the holographic stereogram attached to the attachment means.

12. A holographic stereogram image reproducing apparatus according to claim 11, wherein said non-optimal-viewing position is a non-viewing position.

13. A holographic stereogram image reproducing apparatus, the holographic stereogram comprising a plurality of hologram elements that are generated using a plurality of different images, the apparatus comprising:

an apparatus body;

movable member means connected to the apparatus body such that the movable member means is movable, while the apparatus body remains in a fixed position, between a first position where the movable member means abuts the apparatus body, and a second position different than the first position;

attachment means to which the holographic stereogram is attached such that the holographic stereogram is secured flatly against one of the apparatus body and the movable member means; and light source means for emitting illumination light to be irradiated at a rest predetermined incidence angle onto the holographic stereogram attached to the attachment means;

wherein the apparatus body is an electronic apparatus having at least one electronic function other than illuminating the holographic stereogram, and the movable section is a cover for the electronic apparatus.

* * * * *